(12) United States Patent
Palazzolo et al.

(10) Patent No.: US 7,429,811 B2
(45) Date of Patent: Sep. 30, 2008

(54) FAULT TOLERANT HOMOPOLAR MAGNETIC BEARINGS

(75) Inventors: Alan Palazzolo, College Station, TX (US); Ming-Hsiu Li, College Station, TX (US); Andrew Kenny, College Station, TX (US); Jason Pruess, Brenham, TX (US); Randall P. Tucker, College Station, TX (US); Andrew Provenza, Avon, OH (US); Raymond Beach, North Olmstead, OH (US); Albert Kascak, Bay Village, OH (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 11/142,747

(22) Filed: Jun. 1, 2005

(65) Prior Publication Data
US 2006/0055260 A1    Mar. 16, 2006

Related U.S. Application Data

(60) Provisional application No. 60/576,281, filed on Jun. 1, 2004.

(51) Int. Cl.
*H02K 7/09* (2006.01)

(52) U.S. Cl. ..................................... 310/90.5

(58) Field of Classification Search ................ 310/90.5, 310/179, 254, 261; 318/611, 621, 623
See application file for complete search history.

(56) References Cited

U.S. PATENT DOCUMENTS

| | | | |
|---|---|---|---|
| 5,710,494 A * | 1/1998 | Paweletz | 318/366 |
| 6,078,119 A * | 6/2000 | Satoh et al. | 310/90.5 |
| 6,297,574 B1 * | 10/2001 | Schob et al. | 310/90.5 |
| 6,885,121 B2 * | 4/2005 | Okada et al. | 310/90.5 |

\* cited by examiner

*Primary Examiner*—Thanh Lam
(74) *Attorney, Agent, or Firm*—Conley Rose, P.C.

(57) ABSTRACT

A magnetic bearing for supporting a spinning shaft in the radial direction and/or the axial direction includes a rotor formed on the shaft and a stator positioned around the rotor. Poles in the stator creates a magnetic field that supports the rotor. The number of poles is at least sufficient to produce a selected control force if there is an at least partial loss of current to one or more of the poles. The bearing also includes a set of permanent magnetic elements associated with the poles that create a homopolar, bias magnetic field. A controller connected to the poles is programmed with instructions to change the current to each pole in response to at least a partial loss of current to one or more of the poles and can include a current distribution matrix for determining a current value for each pole in such instances.

19 Claims, 6 Drawing Sheets

FAULT TOLERANT HOMOPOLAR MAGNETIC BEARINGS

CROSS-REFERENCE TO RELATED APPLICATIONS

This application takes priority from U.S. Provisional Patent Application Ser. No. 60/576,281 filed on Jun. 1, 2004.

BACKGROUND OF THE INVENTION

1. Field of the Invention

The invention relates generally to magnetic bearings and, in particular aspects, to the design of such bearings for resistance to magnetic coil failures.

2. Description of the Related Art

Bearings have a rotatable rotor and a stationary stator within which the rotor rotates. Some means of reducing friction between the rotor and stator is necessary. Magnetic bearings replace ball bearings or lubricants with a magnetic field that maintains the rotor in a spaced relation from the stator and allows the rotor to rotate in an essentially frictionless manner with respect to the stator. Magnetic bearings promise significant improvements for uses in space as, for example, storage of power in flywheels and the like. Magnetic suspensions (MS) satisfy the long life and low loss conditions demanded by satellite and ISS (International Space Station) based flywheels used for Attitude Control and Energy Storage (ACES) service.

Homopolar magnetic bearings are those in which the rotor is exposed to a single magnetic polarity (i.e., north or south). Homopolar magnetic bearings are advantageous since they commonly use permanent magnets for bias flux to increase the actuator's efficiency and reduce heat generation. Points on the surface of the spinning journal in the homopolar bearing do not experience north-south flux reversals thereby reducing rotor losses due to hysteresis and eddy currents. Radial magnetic bearings are bearings in which the rotor is magnetically supported radially with respect to the stator, while "combo" bearings provide magnetic support for the rotor in both the radial and axial directions with respect to the stator.

To create the magnetic field, one or more magnetic coils are disposed within the stator. Often, multiple magnetic coils are placed in the stator to form the magnetic field, as this provides for redundancy. Even with multiple coil stators, however, faults are a problem, and it would be desirable to have a bearing that is fault-tolerant. If one or more of the coils were to fail, the flux coupling that retains the rotor in its spaced relation from the stator may become unstable, allowing contact between the rotor and stator or by a "catcher bearing."

There are currently no acceptable known techniques for making a homopolar magnetic bearing "fault-tolerant." The present invention addresses the problems of the prior art.

SUMMARY OF THE INVENTION

In one aspect, the present invention teaches a magnetic bearing for supporting a spinning shaft in the radial direction and/or the axial direction. The magnetic bearing includes a rotor formed on a portion of the shaft and a stator positioned around the rotor. In one arrangement, a plurality of poles in the stator creates a magnetic field that supports the rotor. Each pole produces a pole force and is separated by pole gaps. In embodiments, the poles are shaped to reduce eddy currents and field fringing and are shaped by removing mass in magnetically underutilized regions, the underutilized regions being identified using magnetic field simulations. The number of poles is at least sufficient to provide a set of pole forces that sum to produce a selected control force if there is an at least partial loss of current to one or more of the poles. The number of poles can also be selected by performing a statistical analysis of multiple pole configurations. The bearing also includes a set of permanent magnetic elements associated with the plurality of poles that create a homopolar, bias magnetic field in the pole gaps. The permanent magnetic elements are installed into the stator by applying a force that reduces the magnetic properties of the permanent magnetic element and holding the permanent magnetic element in the stator using a support element. In an exemplary configuration, at least one decoupling choke supplying power to the poles and at least one secondary decoupling choke conditioning the magnetic field created by the poles.

A controller connected to the poles is programmed with instructions to change the current to each pole in response to at least a partial loss of current to one or more of the poles. The controller includes a current distribution matrix for determining a current value for each pole in response to a failure in at least one of the poles. Also, the controller can be programmed to provide a linearized and decoupled relationship between a control voltage applied to the poles and the control force created by the poles.

In other aspects, the invention provides an improved magnetic bearing, system, and method that improves reliability via fault tolerant operation. Flux coupling between poles of a homopolar magnetic bearing is shown to deliver desired forces even after termination of coil currents to a subset of "failed poles". Linear, coordinate decoupled force-voltage relations are also maintained before and after failure by bias linearization. Current distribution matrices (CDM), which adjust the currents and fluxes following a pole set failure, are determined for many faulted pole combinations. The CDM's and the system responses are obtained utilizing 1D magnetic circuit models with fringe and leakage factors derived from detailed, 3D, finite element field models. Reliability results are presented vs. detection/correction delay time and individual power amplifier reliability for 4, 6, and 7 pole configurations. Reliability is shown for two "success" criteria, i.e. (a) no catcher bearing contact following pole failures and (b) re-levitation off of the catcher bearings following pole failures. An advantage of the method presented over other redundant operation approaches is a significantly reduced requirement for backup hardware such as additional actuators or power amplifiers.

It should be understood that examples of the more important features of the invention have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For further understanding of the nature and objects of the present invention, reference should be had to the following drawings in which like parts are given like reference numerals and wherein.

DETAILED DESCRIPTION OF THE PREFERRED EMBODIMENTS

Figure 1:
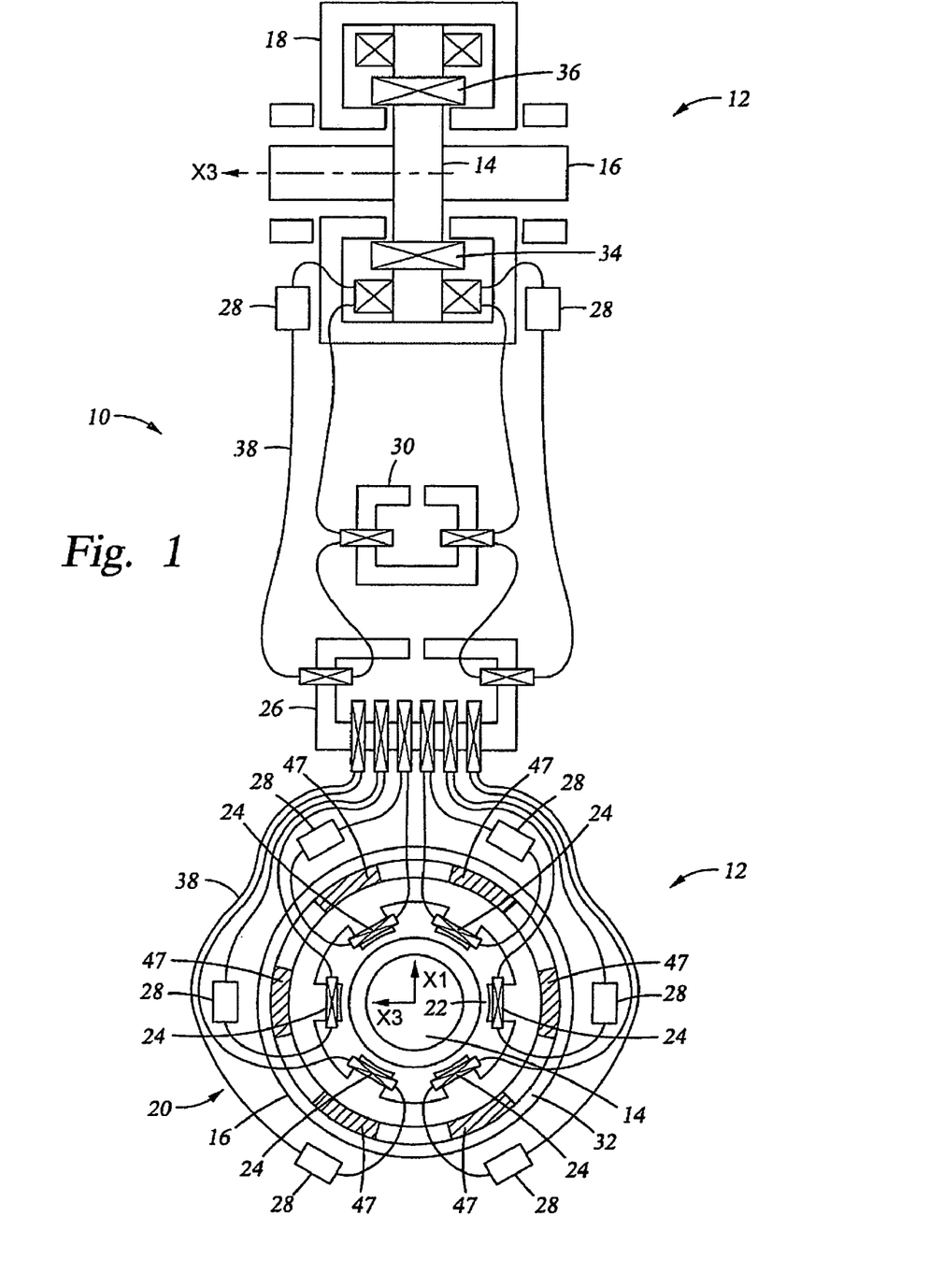
FIG. 1 is a schematic illustration of a six-pole homopolar magnetic bearing.

FIG. 1 depicts an exemplary magnetic bearing assembly, or actuator, 10 in which a magnetic bearing 12 supports a rotor shaft 14 rotatably disposed within a stator 16. FIG. 1A shows the magnetic bearing in cross-section. The assembly 10 also includes an axial catcher beating 18 that secures the rotor 14 against axial movement with respect to the stator 16. The stator 16 includes a generally annular body 20 that defines a rotor opening 22 therewithin. The stator 16 has a plurality of electromagnetic coils, or poles, 24 (six shown in FIG. 1) that create a magnetic field, which supports the rotor 14. Power is supplied to the coils 24 flom a secondary coil decoupling choke 26 and amplified by power amplifiers 28. The secondary coil decoupling choke 26 is operably interconnected to a tertiary coil decoupling choke 30. The secondary and tertiary decoupling chokes 26, 30 are inductors that unify and smooth the magnetic flux created by the coils 24. An air gap 22 is left between the rotor 14 and the stator 16.

Attractive magnetic bearing actuators as shown in FIG. 1 possess individual pole forces that vary quadratically with current. The net force of the bearing 12 may be linearized with respect to the control voltages by utilizing a bias flux component. Thus the $X_1$, $X_2$ and $X_3$ forces become decoupled, i.e. dependent only on their respective control voltages ($V_{c1}$, $V_{c2}$ and $V_{c3}$). A generalization of this approach has been provided for heteropolar magnetic bearings (HEMB), which derive their bias flux from electric coils and utilize both N and S at different poles.

Fault tolerant control of HEMB's has been demonstrated on a 5-axis, flexible rotor test rig with 3 CPU failures and 2 (out of 8) adjacent coil failures. Current distribution matrices for HEMB's were extended to cover 5 pole failures out of 8 poles and for the case of significant effects of material path reluctance and fringing. The fault tolerant approach outlined above utilizes a current distribution matrix (CDM) that changes the current in each pole after failure in order to achieve linearized, decoupled relations between control forces and control voltages, i.e.

$$f_{cj}=K_{vj}V_{cj}, j=1,2,3 \quad (1)$$

A failure configuration is defined by the subset of poles that fail due either to shorting of a turn in a coil or to failure of a power amplifier. In general there exist $(2^n-1)$ number of possible failure configurations for an n pole magnetic bearing.

A unique contribution of the present invention includes extension of a CDM approach to 4, 6 and 7 pole homopolar magnetic bearings (HOMB). The HOMB commonly uses permanent magnets for its bias flux to increase the actuator's efficiency and reduce heat generation. Points on the surface of the spinning rotor journal 14 in the homopolar bearing 12 do not experience north-south flux reversals thereby reducing rotor losses due to hysteresis and eddy currents. A further contribution of the present invention is an investigation of the reliabilities of fault-tolerant HOMBs. The reliabilities presented are system specific for two reasons. First, an exact solution CDM may not exist for certain pole failure configurations. An approximate solution will always exist though and its effectiveness is verified or nullified via failure simulation for the specific system studied. Second, the two types of reliability presented correspond to whether a successful outcome is defined by: Successful Outcome 1 (SO1): No contact between the shaft 14 and catcher bearings 18 during the failure and CDM implementation sequence, or Successful Outcome 2 (SO2): Shaft 14 contact with a catcher bearing 18 then re-levitation occurs during the failure and CDM implementation sequence. Satisfaction of these success criteria will depend on the system studied and the delay time $\tau_d$ required to identify which poles 24 have failed, to turn off the power amplifiers 28 for these poles and to implement the corresponding CDM for the remaining poles 24.

Two types of successful outcomes are defined in order to provide the system designer with magnetic bearing component reliabilities estimates that are either independent (SO1) or dependent (SO2) on the accuracy of the catcher bearing simulation model. Therefore reliabilities are presented for the SO1 and SO2 conditions and for a range of $\tau_d$ values.

The specific system employed for this study is a high-speed flywheel under development for energy storage and attitude control applications on satellites or on the ISS. A general result identified from the study is an increase in reliability as the number of poles increase.

Fault Tolerant Control (FTC)

Derivation of the FTC approach requires applications of Ampere's, Ohm's, Faraday's Laws and the Maxwell Stress Tensor to the multi-path magnetic circuit in a magnetic bearing. The physical requirements of FTC include (a) Decoupling Condition: The $x_i$ control voltage ($V_{ci}$) does not affect the $x_j$ control force ($F_{xj}$) unless i=j, where $x_1=x$ (radial) $x_2=y$ (radial) and $x_3=z$ (axial).

$$\partial F_{xj}/\partial V_{ci}=0, i \neq j \text{ and } i,j=1,2,3 \quad (2)$$

(b) Linearity Condition: The $x_i$ control voltage ($V_{ci}$) and $x_i$ control force ($F_{xi}$) are linearly related.

$$F_{xi}=K_{vi}V_{ci}, i=1,2,3 \quad (3)$$

where $K_{vi}$ is evaluated at the desired operating location of the shaft in the bearing.

(c) Invariance Condition 1: The gains $K_{vi}$ are not affected by the failure.

(d) Invariance Condition 2: The force/position gains $$K_{pi}=(\partial F_{xj}/\partial x_i)|_{V_{cj}=0, X_j=X_{j0}, (j=1,2,3)}, i=1,2,3 \quad (4)$$

are not affected by the failure. The steady state operating point of the shaft in the bearing has coordinates $X_{j0}$.

The FTC requirement (d) is automatically satisfied for a magnetic beating with bias fluxes generated by permanent magnets (PM) 47. This results since the PM's and the resulting bias flux are unaffected by the failure state of the poles.

A complete derivation of the FTC theory is developed next for a 6-pole homopolar combination (combo, radial and axial forces) magnetic bearing (6PHCB). The FTC theory for the 4 and 7 pole bearings is very similar and is not included.

B. Six (6) Pole Homopolar Combo Bearing (6PHCB)

FIG. 1 depicts a combination (radial/axial) 6PHCB 12 installed on a vertically directed shaft 14. The actuator 10 has 6 radial poles and coils 24 and 2 axial poles and coils 34, 36.

The axial coils 34, 36 are wound circumferentially around the shaft 14 and the radial coils 24 are wound around the poles. The coil leads 38 also form secondary coils around a common de-coupling choke (DC) 26 and the axial leads also form tertiary coils around a second DC 30. The DC's eliminate mutual inductances and insure that the inductance matrix is non-singular, which insures electric circuit stability. Laminated construction provides for an accurate approximation of infinite bandwidth between currents and fluxes.

Figure 2:
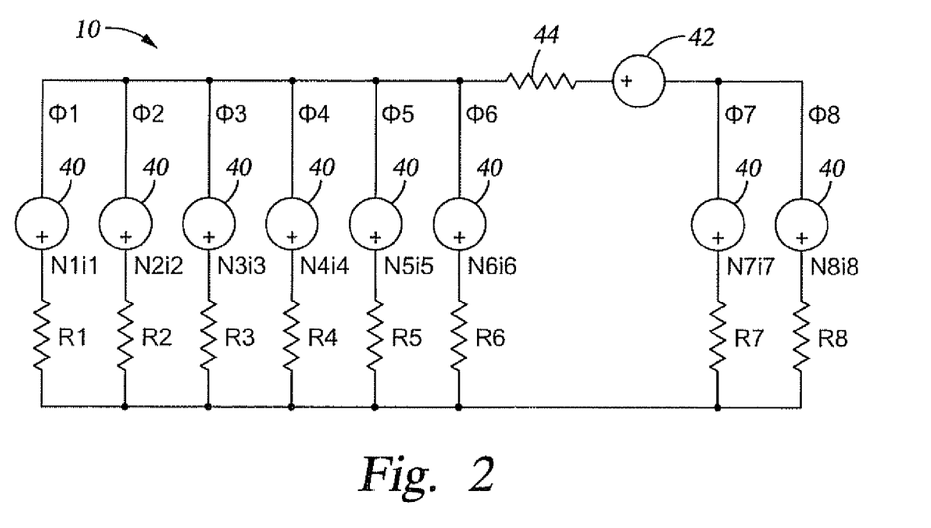
FIG. 2 depicts an equivalent magnetic circuit for the homopolar bearing shown in FIG. 1.

Following common practice, the actuator 10 is modeled as an equivalent circuit with derated magnetic strength accounting for leakage and derated gap flux density ($B_i$) to account for fringing. FIG. 2 shows the 6 flux paths through the radial poles and 2 flux paths through the axial poles. The NI sources 40 represent radial and axial control current flux sources. The $H_c L_{pm}$ (42) and $R_{pm}$ (44) terms represent the permanent magnet source strength for driving bias flux and the reluctance of the permanent magnet, respectively. The magnetic circuit provides a useful tool to present flux conservation and Ampere Law relations with an equivalent electric circuit model. Kirchhoffs law applied to FIG. 2 yields.

$$\begin{bmatrix} R_1 & -R_2 & 0 & 0 & 0 & 0 & 0 & 0 \\ 0 & R_2 & -R_3 & 0 & 0 & 0 & 0 & 0 \\ 0 & 0 & R_3 & -R_4 & 0 & 0 & 0 & 0 \\ 0 & 0 & 0 & R_4 & -R_5 & 0 & 0 & 0 \\ 0 & 0 & 0 & 0 & R_5 & -R_6 & 0 & 0 \\ R_{pm} & R_{pm} & R_{pm} & R_{pm} & R_{pm} & R_{pm}+R_6 & -R_7 & 0 \\ 0 & 0 & 0 & 0 & 0 & 0 & R_7 & -R_8 \\ 1 & 1 & 1 & 1 & 1 & 1 & 1 & 1 \end{bmatrix} \begin{bmatrix} \Phi_1 \\ \Phi_2 \\ \Phi_3 \\ \Phi_4 \\ \Phi_5 \\ \Phi_6 \\ \Phi_7 \\ \Phi_8 \end{bmatrix} =$$

$$\begin{bmatrix} N_1 & -N_2 & 0 & 0 & 0 & 0 & 0 & 0 \\ 0 & N_2 & -N_3 & 0 & 0 & 0 & 0 & 0 \\ 0 & 0 & N_3 & -N_4 & 0 & 0 & 0 & 0 \\ 0 & 0 & 0 & N_4 & -N_5 & 0 & 0 & 0 \\ 0 & 0 & 0 & 0 & N_5 & -N_6 & 0 & 0 \\ 0 & 0 & 0 & 0 & 0 & N_6 & -N_7 & 0 \\ 0 & 0 & 0 & 0 & 0 & 0 & N_7 & -N_8 \\ 0 & 0 & 0 & 0 & 0 & 0 & 0 & 0 \end{bmatrix} \begin{bmatrix} I_1 \\ I_2 \\ I_3 \\ I_4 \\ I_5 \\ I_6 \\ I_7 \\ I_8 \end{bmatrix} + \begin{bmatrix} 0 \\ 0 \\ 0 \\ 0 \\ 0 \\ H_c L_{pm} \\ 0 \\ 0 \end{bmatrix}$$

$$R\Phi = NI + H \quad (5)$$

Let A represent a diagonal matrix of pole gap areas then by assuming uniform flux densities in each gap $$AB = \Phi \quad (6)$$

$$B = VI + B_{bias} \quad (7)$$

$$V = A^{-1} R^{-1} N \quad (8)$$

$$B_{bias} = A^{-1} R^{-1} H \quad (9)$$

where the reluctance of gap i is $$R_i = g_i/(\mu_0 a_i) \quad (10)$$

and $N_i$ and $a_i$ are the number of turns on pole i and the gap-cross section area, respectively. The term V in (8) and the VI term in (7) show that the control flux (VI) varies with control current and with shaft position (gap values), however the bias flux ($B_{bias}$) varies solely with shaft position.

Magnetic bearings typically utilize servo power amplifiers (PA) that provide 1.2–2.0 (kHz) bandwidth for inductive loads ranging between 2 (mH) and 8 (mH). Thus it is acceptable to use a constant for the control current per control voltage gain. Let $$V_c = (V_{c1}\ V_{c2}\ V_{c3})^T \quad (11)$$

represent the control voltages and the matrix T is the current distribution matrix (CDM). Then in the absence of pole failures $$I' = TV_c \quad (12)$$

where T includes the PA gain and the current distribution terms. Fault conditions are represented using the matrix K that has a null row for each faulted pole. Then the failed actuator control currents become $$I = KI' = KTV_c \quad (13)$$

For example if coils 1 and 2 fail $$K = \mathrm{diag}(0\ 0\ 1\ 1\ 1\ 1\ 1\ 1) \quad (14)$$

The magnetic forces are determined from the Maxwell stress tensor as;

$$F_j = B^T \gamma_j B \quad (15)$$

where $$\gamma_1 = \mathrm{diag}[a_i \cos\theta_i/(2\mu_0)], i=1\sim6, \gamma_1(7,7) = \gamma_1(8,8) = 0 \quad (16)$$

$$\gamma_2 = \mathrm{diag}[a_i \sin\theta_i/(2\mu_0)], i=1\sim6, \gamma_2(7,7) = \gamma_2(8,8) = 0 \quad (17)$$

$$\gamma_3(7,7) = -\gamma_3(8,8) = a'/(2\mu_0), \text{ all other components are zero} \quad (18)$$

Substitute (13) into (7):

$$B = WV_c + B_{bias} \quad (19)$$

where W=VKT. The magnetic forces are given in terms of control voltages and bias flux density as;

$$F_j = V_c^T W^T \gamma_j W V_c + 2B_{bias}^T \gamma_j W V_c + B_{bias}^T \gamma_j B_{bias} \text{ for } j=1, 2, 3 \quad (20)$$

The magnetic forces are proportional to the square of control voltages in (20). The following constraint equations must be satisfied in order to meet FTC requirements (a), (b), and (c).

$$W^T \gamma_1 W = 0_{3\times 3} \quad (21)$$

$$2B_{bias}^T \gamma_1 W = [K_{v1}\ 0\ 0] \quad (22)$$

$$W^T \gamma_2 W = 0_{3\times 3} \quad (23)$$

$$2B_{bias}^T \gamma_2 W = [0\ K_{v2}\ 0] \quad (24)$$

$$W^T \gamma_3 W = 0_{3\times 3} \quad (25)$$

$$2B_{bias}^T \gamma_3 W = [0\ 0\ K_{v3}] \quad (26)$$

Let $$W = [W_1\ W_2\ W_3] \quad (27)$$

Then the 27 constraint equations become $$W_i^T \gamma_j W_k = 0, \quad i, j, k = 1, 2, 3 \text{ and } k \geq i \quad (28)$$

$$B_{bias}^T \gamma_i W_j = \begin{cases} 0 \text{ for } i \neq j \\ K_{vi}/2 \text{ for } i = j \end{cases}, \quad i, j = 1, 2, 3 \text{ and } j \geq i \quad (29)$$

Equations (28) and (29) are 18 nonlinear and 9 linear algebraic equations for the CDM entries, $t_{ij}$. The CDM matrix entries are obtained by requiring simultaneous solution of the equations in (28) and (29), and minimization of the Frobenius matrix norm of the CDM matrix. This is typically performed at the magnetic center, i.e. the location where the bias flux balances the static loads on the bearing 12. The norm of the current vector, I in (13), satisfies the consistency condition $$\|I\| \leq \|K\| \cdot \|T\| \cdot \|V_c\| \quad (30)$$

where for a Frobenius norm $$\|K\| = \sqrt{\sum_{i,j} K_{ij}^2} \quad (31)$$

$$\|T\| = \sqrt{\sum_{i,j} t_{ij}^2} \quad (32)$$

$$\begin{bmatrix} R_1 & -R_2 & 0 & 0 & 0 & 0 \\ 0 & R_2 & -R_3 & 0 & 0 & 0 \\ 0 & 0 & R_3 & -R_4 & 0 & 0 \\ 0 & 0 & 0 & R_4 & -R_5 & 0 \\ 0 & 0 & 0 & 0 & R_5 & -R6 \\ R_d+R_{pm} & R_d+R_{pm} & R_d+R_{pm} & R_d+R_{pm} & R_d+R_{pm} & R_d+R_{pm}+R_6 \end{bmatrix} \begin{bmatrix} \Phi_1 \\ \Phi_2 \\ \Phi_3 \\ \Phi_4 \\ \Phi_5 \\ \Phi_6 \end{bmatrix} = \begin{bmatrix} N_1 & -N_2 & 0 & 0 & 0 & 0 \\ 0 & N_2 & -N_3 & 0 & 0 & 0 \\ 0 & 0 & N_3 & -N_4 & 0 & 0 \\ 0 & 0 & 0 & N_4 & -N_5 & 0 \\ 0 & 0 & 0 & 0 & N_5 & -N_6 \\ 0 & 0 & 0 & 0 & 0 & N_6 \end{bmatrix} \begin{bmatrix} I_1 \\ I_2 \\ I_3 \\ I_4 \\ I_5 \\ I_6 \end{bmatrix} + \begin{bmatrix} 0 \\ 0 \\ 0 \\ 0 \\ 0 \\ H_c L_{pm} \end{bmatrix} \quad (37)$$

$$R_d = \sqrt{g_{0d}^2 - x_1^2 - x_2^2} / (\mu_0 a_d) \quad (38)$$

-continued $$\|V_c\| = \sqrt{\sum_{i,j} V_{ci}^2} \quad (33)$$

Thus by (30) reduction of $\|I\|$ follows from minimizing $\|T\|$. The Lagrange multiplier approach is employed to locate a solution of the equations in (28) and (29), that minimize $\|T\|$. The cost function is $$L = \sum_{i=1}^{p} \sum_{j=1}^{3} t_{ij}^2 + \sum_{k=1}^{27} \lambda_k h_k \quad (34)$$

where p is the number of functioning poles and $h_k$ are the constraint equations in (28) and (29). The solution condition is;

$$\frac{\partial L}{\partial Z_m} = 0, \quad Z_m \in \{t_{ij}, \lambda_k\} \quad (35)$$

which implies $$F(t_{ij}, \lambda_k) = \quad (36)$$
$$\left[ h_1 \cdots h_{27} \; \frac{\partial L}{\partial t_{11}} \; \frac{\partial L}{\partial t_{12}} \; \frac{\partial L}{\partial t_{13}} \; \cdots \; \frac{\partial L}{\partial t_{p1}} \; \frac{\partial L}{\partial t_{p2}} \; \frac{\partial L}{\partial p_3} \right]^T = 0$$

The total set of equation is over-determined, i.e. more equations than unknowns, therefore a solution exists only in the least square (LS) sense. The nonlinear equation, LS based solver available in MATLAB is employed for this purpose. The effectiveness of each solution in satisfying the FTC requirements must be checked by transient response simulation of the respective fault event since the LS solution is not exact. Fortunately the feedback control action compensates for the presence of residuals in the solution of (35), in many instances.

6 Pole Homopolar Radial Bearing (6PHRB)

A 6 pole homopolar radial bearing (6PHRB) provides force solely in the two transverse (radial) directions. The flux-current relations for this circuit are obtained by applying Kirchoff's laws, which yield The FTC requirements result in 10 constraint equations $$W^T \gamma_1 W = 0_{2 \times 2} \quad (39)$$

$$2B_{bias}{}^T \gamma_1 W = [K_{v1} \; 0] \quad (40)$$

$$W^T \gamma_2 W = 0_{2 \times 2} \quad (41)$$

$$2B_{bias}{}^T \gamma_2 W = [0 \; K_{v2}] \quad (42)$$

These equations are solved for $t_{ij}$ and $\lambda_k$ utilizing the Lagrange multiplier/nonlinear least square solver approach discussed for the 6PHCB.

Decoupling Choke

The inductance matrix of an isolated combo bearing is singular because flux conservation introduces a dependency relation between the fluxes. This produces a potentially unstable operation state for the power amplifiers. Two decoupling chokes are added to the combo bearing according to a known technique referred to as Meeker's approach. By adjusting the parameters ($N_{c1}$, $N_{c2}$, $N_{c3}$, $R_{c1}$, $R_{c2}$) of the decoupling chokes 26, 30, the inductance matrix becomes full rank and the mutual inductances become zero. Similarly, a single decoupling choke is added to the radial bearing.

Force Linearization

An exact solution for the $t_{ij}$ can be obtained only for a "no-poles failed" case. Consequently the FTC linearization and decoupling conditions are only approximately satisfied and the force expressions in (20) are still somewhat nonlinear. Closed loop, coupled, flexible body simulations of the flywheel rim and shaft, housing, gimbals, and support structure provide predictions of stability, transient and steady-state harmonic responses. Efficient run-times for these models require linearized expressions for the $X_1$, $X_2$ and $X_3$ magnetic forces. These expressions are obtained by applying a two-term Taylor series expansion about the operating point $P_0 = \{x_j = x_{j0}, v_{cj} = v_{cj0}\}$. This yields $$F_i = \sum_{j=1}^{3} \{-K_{pij}(x_j - x_{j0}) + K_{vij}(v_{cj} - v_{cj0})\} \tag{43}$$

$$K_{pij} = [-2B_{bias}^T \gamma_i (\partial B_{bias}/\partial x_j)]|_{P_0} \tag{44}$$

$$K_{vij} = [2B_{bias}^T \gamma_i W(\partial V_c/\partial v_{cj})]|_{P_0} \tag{45}$$

for i,j=1,2,3. The $K_{pij}$ and $K_{vij}$ expressions in (44) and (45) are referred to as "position" and "voltage" stiffnesses respectively. The $K_{vij}$ terms are zero for i≠j, only if equation (36) is satisfied exactly. Equation (20) shows that the $K_{pij}$, as defined in (44), are independent of the $t_{ij}$, when $V_{c0}$ is a null vector, which is typically true.

Flywheel and Magnetic Suspension Dynamics Model

Figure 3:
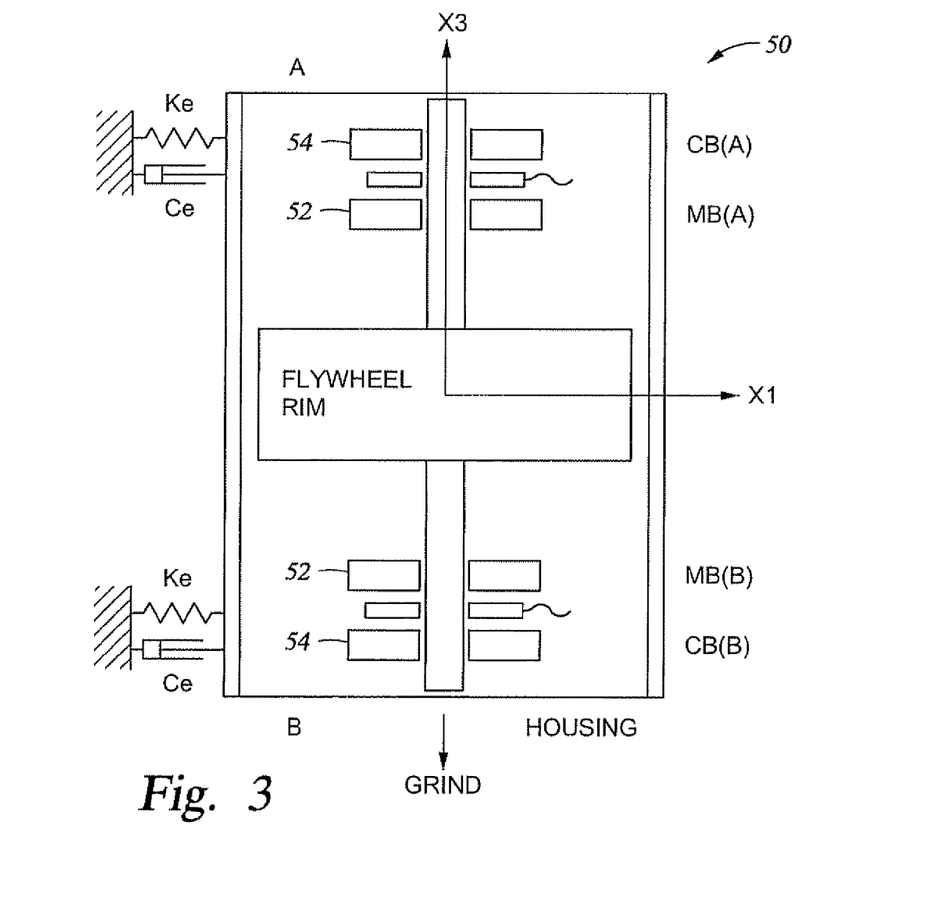
FIG. 3 illustrates a flywheel system with a magnetic suspension in accordance with one embodiment of the present invention.

The novel redundant actuators operate within a feedback-controlled system that includes both electrical component and structural component dynamics. A typical application is a flywheel module consisting of a high-speed shaft, integrally mounted motor-generator, composite flywheel rim, magnetic suspension and flexibly mounted housing. FIG. 3 depicts a module model 50 with 9 rigid body structural degrees of freedom: rotor CG translations ($X_{1r}$, $X_{2r}$, $X_{3r}$), rotor rotations ($\theta_{1r}$, $\theta_{2r}$), housing CG translations ($X_{1h}$, $X_{2h}$) and housing rotation ($\theta_{1h}$, $\theta_{2h}$). The magnetic suspension employs magnetic (MB) and backup (catcher, CB) bearings 52, 54, respectively, at both the A and B ends of the module. Magnetic bearing clearances are approximately 0.5 (mm) so small angle motion may be assumed. Let b, d and c denote the magnetic actuator (equation 20), mass imbalance and catcher bearing forces, respectively. The structural equations of motion for the rotor are:

$$M_r \ddot{X}_{ir} = F_{ib}^A + F_{ib}^B + F_{id}^A + F_{id}^B + F_{ic}^A + F_{ic}^B \quad i = 1, 2 \tag{46}$$

$$M_r \ddot{X}_{3r} = F_{3b}^A - M_r g + F_{3c}^A \tag{47}$$

$$I_{tr}\ddot{\theta}_{1r} + I_{pr}\omega\dot{\theta}_{2r} = M_{1r} + M_{1rc}^A + M_{1rc}^B \tag{48}$$

$$I_{tr}\ddot{\theta}_{2r} - I_{pr}\omega\dot{\theta}_{1r} = M_{2r} + M_{2rc}^A + M_{2rc}^B \tag{49}$$

For the housing the equations of motion are:

$$M_h \ddot{X}_{ih} = F_{ie}^A + F_{ie}^B - F_{ib}^A - F_{ib}^B - F_{ic}^A - F_{ic}^B \quad i = 1, 2 \tag{50}$$

$$I_{tih}\ddot{\theta}_{ih} = M_{ih} + M_{ihc}^A + M_{ihc}^B \quad i = 1, 2 \tag{51}$$

where $$M_{1r} = -L_{br}^A F_{2b}^A + L_{br}^B F_{2b}^B - L_{dr}^A F_{2d}^A + L_{dr}^B F_{2d}^B \tag{52}$$

$$M_{2r} = L_{br}^A F_{1b}^A - L_{br}^B F_{1b}^B + L_{dr}^A F_{1d}^A - L_{dr}^B F_{1d}^B \tag{53}$$

$$M_{1h} = L_{bh}^A F_{2b}^A - L_{bh}^B F_{2b}^B - L_e^A F_{2e}^A + L_e^B F_{2e}^B \tag{54}$$

$$M_{2h} = -L_{bh}^A F_{1b}^A + L_{bh}^B F_{1b}^B + L_e^A F_{1e}^A - L_e^B F_{1e}^B \tag{55}$$

$$F_{1e}^A = -K_e(X_{1h} + L_e^A \theta_{2h}) - C_e(\dot{X}_{1h} + L_e^A \dot{\theta}_{2h}) \tag{56}$$

$$F_{1e}^B = -K_e(X_{1h} - L_e^B \theta_{2h}) - C_e(\dot{X}_{1h} - L_e^B \dot{\theta}_{2h}) \tag{57}$$

$$F_{2e}^A = -K_e(X_{2h} + L_e^A \theta_{1h}) - C_e(\dot{X}_{2h} + L_e^A \dot{\theta}_{1h}) \tag{58}$$

$$F_{2e}^B = -K_e(X_{2h} - L_e^B \theta_{1h}) - C_e(\dot{X}_{2h} + L_e^B \dot{\theta}_{1h}) \tag{59}$$

More sophisticated models with internal dynamics of races and balls or rollers are available and could also be used in the system dynamics model. Let j=1,2 represent the A and B ends of the flywheel module (not shown), respectively. Also let $r_j$ represent the relative displacement between the catcher bearing (not shown) and rotor shaft (not shown) at end j.

$$r_j = \sqrt{(X_{1rc}^j - X_{1hc}^j)^2 + (X_{2rc}^j - X_{2hc}^j)^2} \tag{60}$$

Then if $r_0$ is the catcher bearing clearance and $r_j \geq r_0$ $$F_n^j = K_c(r_j - r_0) + C_c \dot{r}_j \tag{61}$$

$$F_{1c}^j = -F_n^j(\cos\theta_j - \mu\sin\theta_j) \tag{62}$$

$$F_{2c}^j = -F_n^j(\sin\theta_j + \mu\cos\theta_j) \tag{63}$$

$$M_{1rc}^j = (-1)^j L_{cr}^j F_{2c}^j \tag{64}$$

$$M_{2rc}^j = (-1)^{j+1} L_{cr}^j F_{1c}^j \tag{65}$$

$$M_{1hc}^j = (-1)^{j+1} L_{ch}^j F_{2c}^j \tag{66}$$

$$M_{2hc}^j = (-1)^j L_{ch}^j F_{1c}^j \tag{67}$$

Similarly for the axial direction if $|X_{3r}| \geq 0$.

$$F_{3c}^A = -[K_c(|X_{3r}| - r_0)X_{3r}/|X_{3r}| + C_c \dot{X}_{3r}] \tag{68}$$

The mass imbalance disturbance in the model is described by $$F_{1d}^A = M_r e \omega^2 \cos\omega t \tag{69}$$

$$F_{2d}^A = M_r e \omega^2 \sin\omega t \tag{70}$$

$$F_{1d}^B = M_r e \omega^2 \cos(\omega t + \psi) \tag{71}$$

$$F_{2d}^B = M_r e \omega^2 \sin(\omega t + \psi) \tag{72}$$

Figure 4:
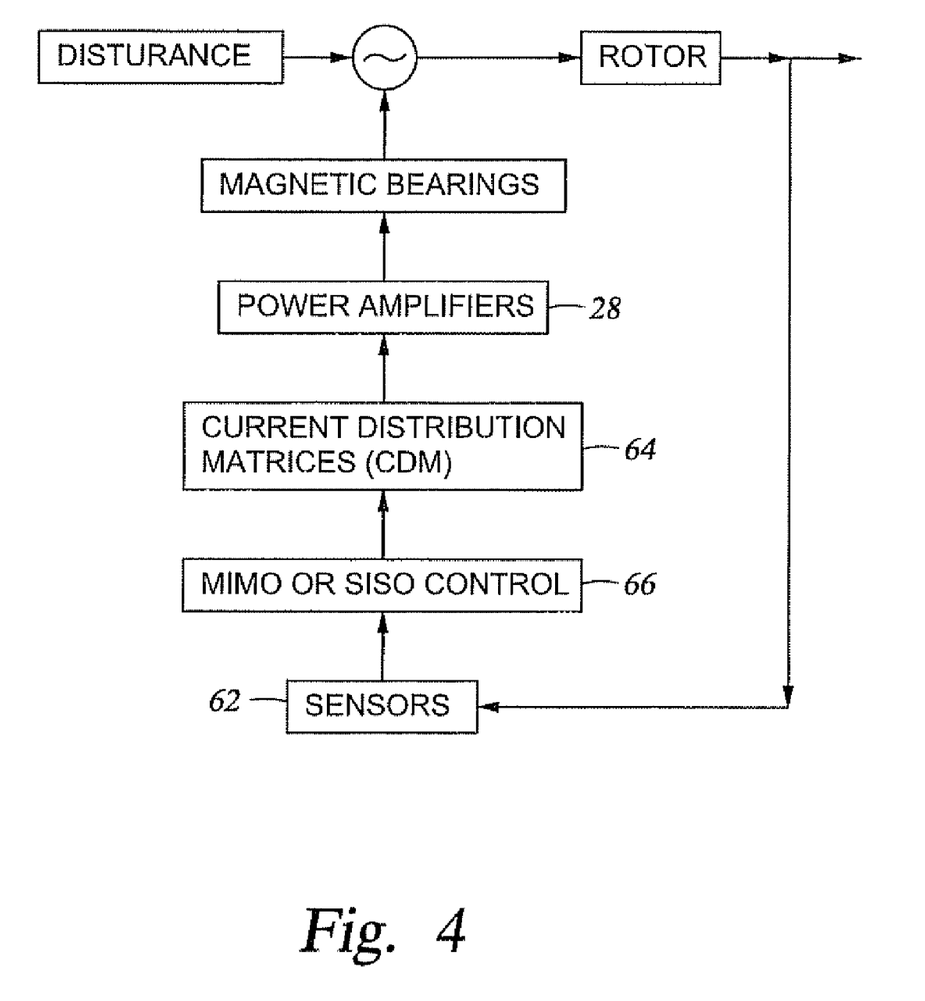
FIG. 4 is a schematic depiction of a magnetic suspension control scheme, in accordance with the present invention.
Figure 5:
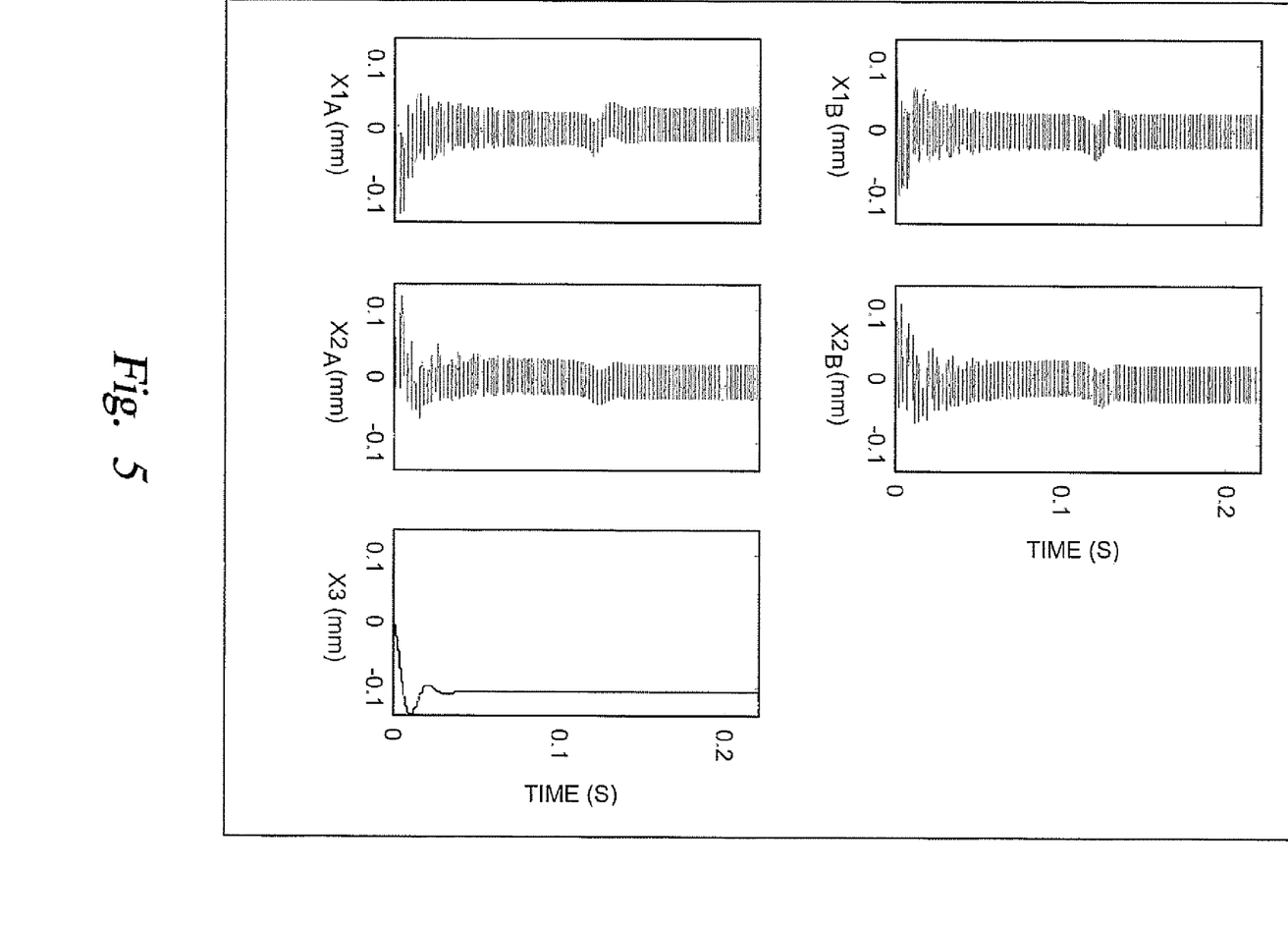
FIG. 5 is a series of charts depicting rotor displacements in the radial and axial directions for Example 2.
Figure 6:
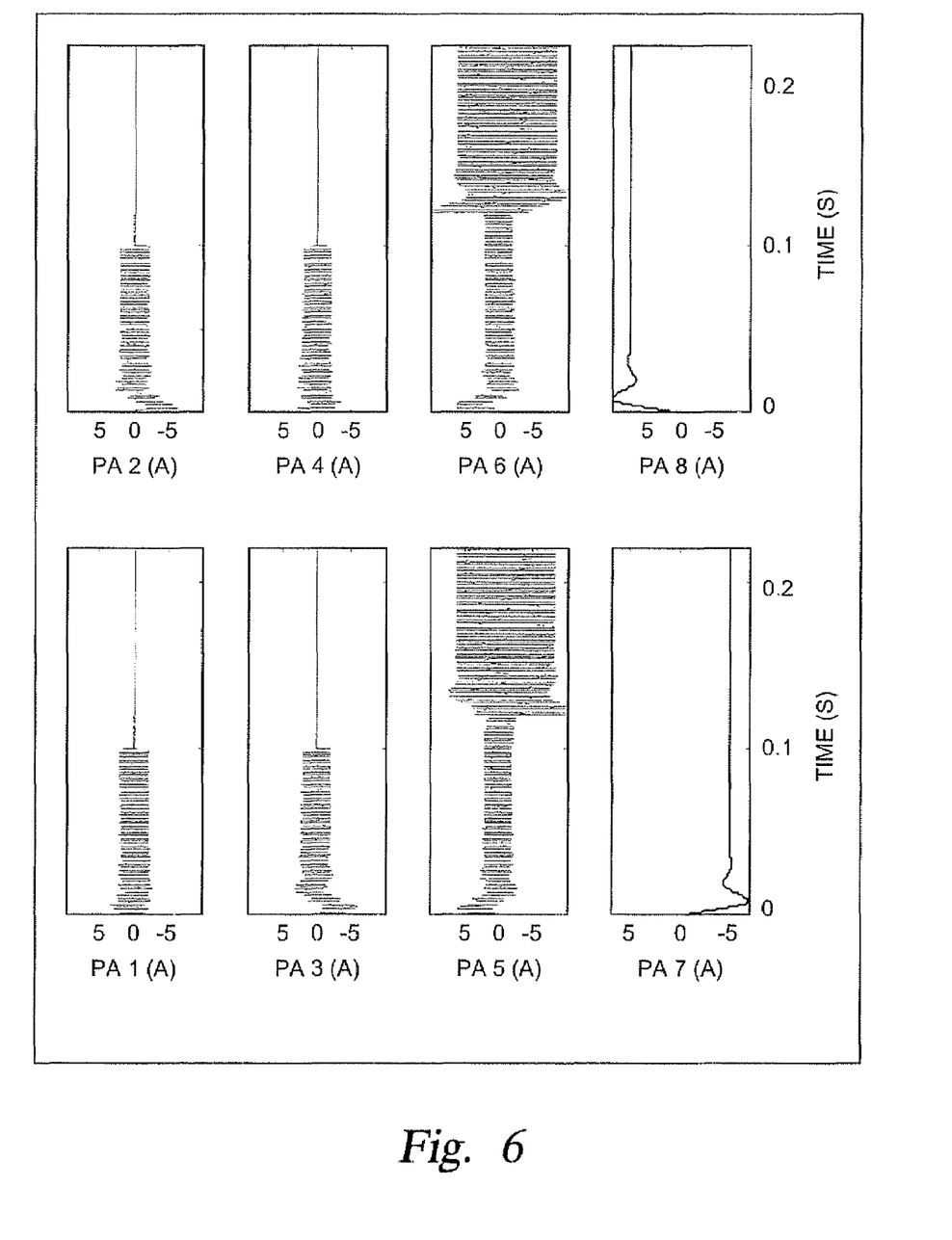
FIG. 6 is a series of charts depicting current responses in a combo bearing for Example 2.

FIG. 4 illustrates the overall feedback control loop for the magnetic suspension. Eight power amplifiers 28 are utilized for a combo bearing and 6 power amplifiers 28 for a radial bearing. Five displacement sensors 62 measure the relative displacements between the rotor 14 and the stator housing 16. Current distribution matrices (CDMs) 64 for combo and radial bearings are incorporated in a controller 66 to produce reference voltages for the 14 power amplifiers 28 that produce the desired currents in each coil 24. The nonlinear magnetic forces are determined according with (20).

EXAMPLES

An example flywheel module illustrates operation and reliability of the redundant magnetic suspension. Table 1 lists the geometrical, inertia and stiffness parameters for the model. A suitable catcher bearing contact model can have a stiffness of $10^8$ (N/m), a damping of 5,000 (N-s/m) and a dynamic friction coefficient of 0.1. Table 2 shows the magnetic bearing parameters for the MS model.

The 1D magnetic circuit model shown in FIG. 2 must be adjusted to include the effects of recirculation leakage of the flux between the N and S poles of any permanent magnet and for the effect of non-parallel (fringing) flux flow in the air gap of each pole. These adjustments are made with multiplicative factors applied to the gap flux and permanent magnetic (PM) coercive force in the 1D model, as derived from the 3D FE model. The PM coercive force is derated from 950,000 to 514,000 in the combo bearing and from 950,000 to 566,000 in the radial bearing. The air gap 22 fluxes are derated with a fringe factor of 0.9 for both the combo and radial bearings.

The remaining parameters of the system model include displacement sensor sensitivity=7874 (V/m), displacement sensor bandwidth=5000 (Hz), power amplifier DC gain=1 (A/V), and power amplifier bandwidth=1200 (Hz).

TABLE 1

FLYWHEEL MODEL PARAMETER LIST

| Parameter | Value | Parameter | Value |
|---|---|---|---|
| $M_r$ | 29.644 (kg) | $M_h$ | 34.428 (kg) |
| $I_{tr}$ | 0.26233 (kg.m²) | $I_{pr}$ | 0.11129 (kg.m²) |
| $I_{t1h}$ | 1.5337 (kg.m²) | $I_{t2h}$ | 1.3993 (kg.m²) |
| $K_e$ | $3.5024 \times 10^5$ (N/m) | $C_e$ | $5.2535 \times 10^3$ (kg/s) |
| $\omega$ | 60,000 (rpm) | $e$ | $2.54 \times 10^{-6}$ (m) |
| $L_{br}^A$ | 0.14051 (m) | $L_{br}^B$ | 0.13360 (m) |
| $L_{dr}^A$ | 0.14051 (m) | $L_{dr}^B$ | 0.13360 (m) |
| $L_{sr}^A$ | 0.17846 (m) | $L_{sr}^B$ | 0.16974 (m) |
| $L_{cr}^A$ | 0.26765 (m) | $L_{cr}^B$ | 0.28067 (m) |
| $L_{bh}^A$ | 0.14051 (m) | $L_{bh}^B$ | 0.13360 (m) |
| $L_{sh}^A$ | 0.17856 (m) | $L_{sh}^B$ | 0.16974 (m) |
| $L_{ch}^A$ | 0.26765 (m) | $L_{ch}^B$ | 0.28067 (m) |
| $L_e^A$ | 0.26765 (m) | $L_e^B$ | 0.28067 (m) |
| $\psi$ | $\pi/2$ | | |

TABLE 2

MAGNETIC BEARING PARAMETER LIST

| Parameter | Combo Bearing | Radial Bearing |
|---|---|---|
| air gap | radial: $5.080 \times 10^{-4}$ (m) axial: $5.080 \times 10^{-4}$ (m) | Radial: $5.080 \times 10$-4 (m) dead pole: 0.00203 (m) |
| Radial pole face area | $3.924 \times 10^{-4}$ (m²) | $4.746 \times 10^{-4}$ (m²) |
| Axial pole face area | $1.719 \times 10^{-3}$ (m²) | N/A |
| Dead pole face area | N/A | $4.962 \times 10^{-3}$ (m²) |
| total face area of PM | $3.178 \times 10^{-3}$ (m²) | $3.844 \times 10^{-3}$ (m²) |
| Length of PM | 0.0101 (m) | 0.0101 (m) |
| number of turns of radial coil | 24 | 24 |
| number of turns of axial coil | 37 | N/A |
| relative permeability of PM | 1.055 | 1.055 |
| Coercive force of PM | 950000 (A/m) | 950000 (A/m) |

These 3D bearing models were also employed to verify the fault tolerant operation predicted with the 1D model. An example of this is the 3 pole failure results shown in Table 3. The control voltage sets in this table are;

TABLE 3

1D AND 3D MODEL COMPARISON OF PREDICTED FORCES FOR 6 POLE COMBO BEARING $$V_c = (V_{c1} \ V_{c2} \ V_{c3})^T = \begin{cases} (1V \ 0 \ 0)^T & \text{for set 1} \\ (0 \ 1V \ 0)^T & \text{for set 2} \\ (0 \ 0 \ 1V)^T & \text{for set 3} \end{cases} \quad (73)$$

| Control Voltage Set | Force Direction | No Poles Failed 1D Model | No Poles Failed 3D Model | 3 Poles Failed 1D Model | 3 Poles Failed 3D Model |
|---|---|---|---|---|---|
| 1 | X1 | 11.64 | 12.95 | 11.64 | 12.96 |
| 1 | X2 | 0 | 0.01 | −0.14 | −0.25 |
| 1 | X3 | 0 | 0.04 | 0 | −0.03 |
| 2 | X1 | 0 | 0.02 | 0 | −0.08 |
| 2 | X2 | 11.64 | 13.3 | 11.59 | 13.17 |
| 2 | X3 | 0 | 0.08 | 0 | −0.05 |
| 3 | X1 | 0 | −0.4 | 0 | −0.4 |
| 3 | X2 | 0 | 0.66 | 0 | 0.66 |
| 3 | X3 | 8.9 | 9.4 | 8.9 | 9.4 |

The inductance matrix of the combo bearing with the two decoupling chokes is given in henries as:

$$L_{CB} = 5.59 \times 10^{-4} \cdot \text{diag}(1\ 1\ 1\ 1\ 1\ 1\ 10.43\ 10.43) \quad (74)$$

The inductance matrix of the radial bearing with a decoupling choke is given in henries as:

$$L_{RB} = 6.76 \times 10^{-4} \cdot \text{diag}(1\ 1\ 1\ 1\ 1\ 1) \quad (75)$$

The current produced by a power amplifier (PA) is turned off at the moment of failure, which simulates an open circuit. This is implemented in the model by changing the K matrix in (13) from the identity matrix to its pole-failed value, i.e. a null row j for each failed pole j, while the no-pole failed CDM is retained. The appropriate CDM for the pole-failure configuration being tested is then swapped in following a delay time $\tau_d$. The MIMO control law in FIG. 4 is invariant throughout the entire simulation. The combo and radial bearing CDM's for the no pole failed state are:

$$T_o^A = \begin{bmatrix} 0.30789 & 0.17776 & 0 \\ 0 & 0.35552 & 0 \\ -0.30789 & 0.17776 & 0 \\ -0.30789 & -0.17776 & 0 \\ 0 & -0.35552 & 0 \\ 0.30789 & -0.17776 & 0 \\ 0 & 0 & -0.11530 \\ 0 & 0 & 0.11530 \end{bmatrix} \text{ and} \quad (76)$$

$$T_o^B = \begin{bmatrix} 0.28074 & 0.16209 \\ 0 & 0.32417 \\ -0.28074 & 0.16209 \\ -0.28074 & -0.16209 \\ 0 & -0.32417 \\ 0.28074 & -0.16209 \end{bmatrix}$$

The new CDM's for the poles 1–2 failed case in FIG. 1 are $$T_{12}^A = \begin{bmatrix} 0 & 0 & 0 \\ 0 & 0 & 0 \\ -0.66389 & 0 & 0 \\ -0.23032 & -0.58296 & 0 \\ -0.28545 & -0.48360 & 0 \\ 0.33734 & -0.57934 & 0 \\ 0 & 0 & -0.11530 \\ 0 & 0 & 0.11530 \end{bmatrix} \text{ and} \quad (77)$$

$$T_{12}^B = \begin{bmatrix} 0 & 0 \\ 0 & 0 \\ -0.60475 & 0 \\ -0.21182 & -0.53041 \\ -0.34967 & -0.44211 \\ 0.30640 & -0.52769 \end{bmatrix}$$

The new CDM's for the poles 1-2-3-4 failed case in FIG. 1 are:

$$T_{1234}^A = \begin{bmatrix} 0 & 0 & 0 \\ 0 & 0 & 0 \\ 0 & 0 & 0 \\ 0 & 0 & 0 \\ -0.60742 & -1.0622 & 0 \\ 1.2224 & -3.6408 \times 10^{-3} & 0 \\ 0 & 0 & -0.11530 \\ 0 & 0 & 0.11530 \end{bmatrix} \text{ and} \quad (78)$$

$$T_{1234}^B = \begin{bmatrix} 0 & 0 \\ 0 & 0 \\ 0 & 0 \\ 0 & 0 \\ -0.55379 & -0.96848 \\ 1.11460 & -3.3556 \times 10^{-3} \end{bmatrix}$$

The text below discusses two illustrative examples that assume identical failures in both the radial and combo bearings. Although this represents a rare occurrence it serves to illustrate the method and analysis presented. Example 1 considers failing radial poles 1 and 2, and example 2 considers failing radial poles 1, 2, 3 and 4 in FIG. 1.

Consequently successful outcome criteria SO1 is satisfied independent of the delay time $\tau_d$. In contrast, example 2's SO1 is not always satisfied so that the 1-2-3-4 poles failed CDM's ($T_{1234}^A, T_{1234}^B$) must be activated after delay time $\tau_d$. The reliability for example 2 will be affected by the selection of SO1 or SO2 and the delay time $\tau_d$.

Successful outcome criteria 2 (SO2) requires that the rotor 14 successfully levitates following contact with the catcher bearings (CB) 18. This is highly dependent on whether backward whirl (BW) develops during the contact period. The BW state occurs due to friction at the contact interface between the rotor shaft 14 and CB 18, which forces the shaft 14 to whirl (precess) in a direction opposite to the spin direction. The BW eccentricity is the CB clearance (typically 0.25 mm) for a rigid rotor 14, and possibly a much larger value for a flexible shaft. The whirl frequency typically ranges from 0.4–1.0 times the spin frequency. This creates a potentially large centrifugal force that can damage the CB's or deflect the shaft into the MB's. The BW condition is mitigated by proper design of the flexible damped support, preload, clearance and friction coefficient for the CB's. Relevitation off of the CB's is very difficult once BW has fully developed.

Reliabilities of Magnetic Bearings

The reliability of a magnetic suspension (MS) is determined by considering the number of failed pole states that still meet the SO1 or SO2 criteria. This is dependent on the time delay $\tau_d$, modeling assumptions, number of poles in the bearing and the reliability of the power amplifier/coil units that drive and conduct the bearing currents. The 4 pole and 7 pole configurations require 2 less or 1 more power amplifiers than the 6-pole configuration, respectively. The radial pole and permanent magnet cross-section areas, the number of turns of each radial coil, and the coercive force and the length of the permanent magnets for the 4 and 7 pole bearings are identical to those of the 6-pole bearing.

TABLE 4

SUMMARY OF SIMULATION FOR RELIABILITY STUDY

| n pole Bearing | Failed Bearing | No. of unfailed Poles (j) | No. of Simulation ($I_{nj}$) | Delay time $\tau_d$ 20 (ms) | | Delay time $\tau_d$ 60 (ms) | | Delay time $\tau_d$ 100 (ms) | | No Pole Failed |
|---|---|---|---|---|---|---|---|---|---|---|
| | | | | No. of SO1 cases | No. of SO1 + SO2 cases | No. of SO1 cases | No. of SO1 + SO2 cases | No. of SO1 cases | No. of SO1 + SO2 cases | CDM No. of SO1 cases |
| 4 | Radial | 2 | 6 | 4 | 4 | 4 | 4 | 4 | 4 | 4 |
| | | 3 | 4 | 4 | 4 | 4 | 4 | 4 | 4 | 4 |
| | | 4 | 1 | 1 | 1 | 1 | 1 | 1 | 1 | 1 |
| | Combo | 2 | 6 | 4 | 4 | 4 | 4 | 4 | 4 | 4 |
| | | 3 | 4 | 4 | 4 | 4 | 4 | 4 | 4 | 4 |
| | | 4 | 1 | 1 | 1 | 1 | 1 | 1 | 1 | 1 |
| 6 | Radial | 2 | 15 | 12 | 12 | 0 | 12 | 0 | 12 | 0 |
| | | 3 | 20 | 20 | 20 | 9 | 20 | 8 | 20 | 8 |
| | | 4 | 15 | 15 | 15 | 15 | 15 | 15 | 15 | 12 |
| | | 5 | 6 | 6 | 6 | 6 | 6 | 6 | 6 | 6 |
| | | 6 | 1 | 1 | 1 | 1 | 1 | 1 | 1 | 1 |
| | Combo | 2 | 15 | 12 | 12 | 1 | 12 | 0 | 11 | 0 |
| | | 3 | 20 | 20 | 20 | 15 | 20 | 9 | 20 | 8 |
| | | 4 | 15 | 15 | 15 | 15 | 15 | 15 | 15 | 12 |
| | | 5 | 6 | 6 | 6 | 6 | 6 | 6 | 6 | 6 |
| | | 6 | 1 | 1 | 1 | 1 | 1 | 1 | 1 | 1 |
| 7 | Radial | 2 | 21 | 16 | 21 | 0 | 21 | 0 | 21 | 0 |
| | | 3 | 35 | 33 | 34 | 11 | 29 | 4 | 30 | 0 |
| | | 4 | 35 | 35 | 35 | 29 | 35 | 20 | 35 | 14 |
| | | 5 | 21 | 21 | 21 | 21 | 21 | 21 | 21 | 21 |
| | | 6 | 7 | 7 | 7 | 7 | 7 | 7 | 7 | 7 |
| | | 7 | 1 | 1 | 1 | 1 | 1 | 1 | 1 | 1 |
| | Combo | 2 | 21 | 13 | 14 | 0 | 14 | 0 | 14 | 0 |
| | | 3 | 35 | 28 | 28 | 13 | 28 | 5 | 28 | 1 |
| | | 4 | 35 | 35 | 35 | 28 | 35 | 21 | 35 | 11 |
| | | 5 | 21 | 21 | 21 | 21 | 21 | 21 | 21 | 17 |
| | | 6 | 7 | 7 | 7 | 7 | 7 | 7 | 7 | 7 |
| | | 7 | 1 | 1 | 1 | 1 | 1 | 1 | 1 | 1 |

The no-pole failed CDM's for the 7 pole bearing are:

$$T_o^A = \begin{bmatrix} 0.33071 & -0.017910 & -4.6780 \times 10^{-3} \\ 0.17799 & 0.26601 & 3.6330 \times 10^{-3} \\ -0.067428 & 0.26396 & -2.7850 \times 10^{-3} \\ -0.26676 & 0.16181 & 7.8561 \times 10^{-4} \\ -0.29880 & -0.15575 & 1.7079 \times 10^{-3} \\ -0.038458 & -0.29204 & -4.2590 \times 10^{-3} \\ 0.15965 & -0.23855 & 4.9591 \times 10^{-3} \\ 0 & 0 & -0.099552 \\ 0 & 0 & 0.099552 \end{bmatrix} \text{ and}$$

$$T_o^B = \begin{bmatrix} 0.28402 & 0 \\ 0.17708 & 0.22206 \\ -0.63201 & 0.27690 \\ -0.25589 & 0.12323 \\ -0.25589 & -0.12323 \\ -0.063201 & -0.27690 \\ 0.17708 & -0.22206 \end{bmatrix}$$

(79)

The no-pole failed CDM's for the 4 pole bearing are:

$$T_o^A = \begin{bmatrix} 0.52550 & 0 & 0 \\ 0 & 0.52550 & 0 \\ -0.52550 & 0 & 0 \\ 0 & -0.52550 & 0 \\ 0 & 0 & -0.17043 \\ 0 & 0 & 0.17043 \end{bmatrix} \text{ and}$$

$$T_o^B = \begin{bmatrix} 0.46539 & -1.07319 \times 10^{-3} \\ 7.3028 \times 10^{-4} & 0.46371 \\ -0.46403 & -1.07319 \times 10^{-3} \\ 7.3028 \times 10^{-4} & -0.46571 \end{bmatrix}$$

(80)

The radial pole failure simulations are conducted with the combo bearing operating in a no-pole failed state, and vice versa. Failure occurs at 0.1 seconds into the simulation and swapping in of the new CDM occurs at a delay time $\tau_d$ later. The number of j unfailed pole cases for an n pole bearing is given by the formula $$I_{nj} = \binom{n}{j} = \frac{n!}{j!(n-j)!} \quad (81)$$

Table 4 summarizes the results of these simulations for swapping in the appropriate poles-failed (new) CDM for the delay times $\tau_d$ of 20, 60, and 100 (ms), respectively. The SO1+SO2 column considers all cases when either SO1 or SO2 occurs.

Figure 7:
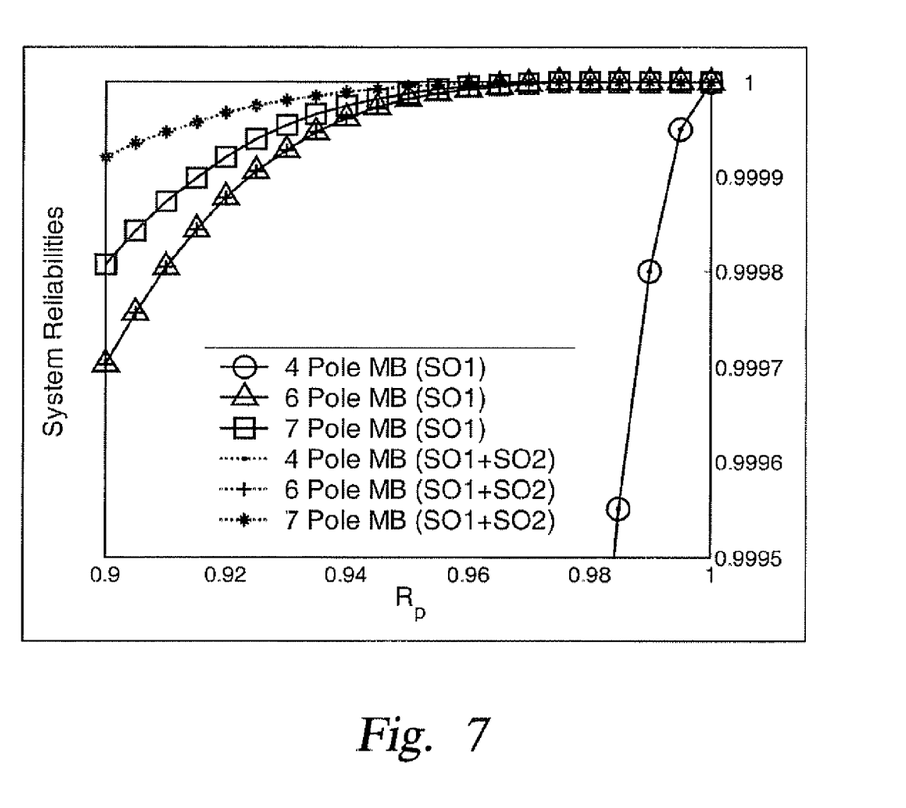
FIG. 7 is a chart illustrating system reliabilities of 4, 6 and 7-pole radial bearings with $\tau_d=20$ (ms).

An n-pole, fail-safe, homopolar magnetic bearing is similar to an m-out-of-n system in a reliability model if stable control is maintained (SO1 or SO2) when at minimum m of the n poles (P.A. plus coil) are unfailed. Let $R_p$ represent the reliability of a "pole", i.e. of the power amplifier plus its pole coil, at some specific point in its expected lifetime. Also assume that "poles" are identical and act independently. The system reliability then become $$R_S = \sum_{k=m}^{n} \alpha_k R_p^k (1 - R_p)^{n-k} \quad (82)$$

where $\alpha_k$ are the number of SO1 (or SO1+SO2) cases in Table 4. The integer m in (82) is the minimum number of unfailed poles that are required for the n pole bearing to successfully levitate the shaft. The (n,m) pairs determined in this example are (4,2), (6,2) and (7,2). FIG. 7 shows system reliability vs. $R_p$ plots for the 4, 6 and 7 pole bearings for SO1 and (SO1+SO2) and $\tau_d$ equal to 20, 60 and 100 (ms) for the zoomed-in range 0.9<$R_p$<1. Axial control reliability is not considered in these figures since it is typically independent of radial direction control.

Current distribution matrices (CDM) are evaluated based on the set of poles that have failed and the requirements for uncoupled force/voltage control, linearity and specified force/voltage gains that are unaffected by the failure. The CDM algorithm also determines the CDM with a minimum Frobenius norm, which provides reduced effort (current required) operation of the HOMB. An advantage of the HOMB over a HEMB is the automatic invariance of the position stiffness before and after pole failure. This results from the bias flux source being permanent magnets. A simplified catcher bearing model is employed to evaluate the improvement in reliability which results from utilizing a success criterion (SO2) based on re-levitation after catcher bearing contact vs. a criterion (SO1) which excludes all contacts with the spinning shaft. The SO1 criterion is more conservative since it does not depend on the accuracy of the catcher bearing model used in the simulation.

The numerical example presented exhibits several interesting trends which include (i) the reliability of the 4, 6 or 7 pole bearing is high even if the reliability of the pole decreases with time to 0.90; (ii) increased reliability with increased number of poles, (iii) high reliability without replacing the no-poles failed CDM with the appropriate poles-failed CDM, (iv) successful levitation with only 2 unfailed poles for the n=4, 6 and 7 pole HOMB's, (v)successful fault tolerant operation without changes to the MIMO control in FIG. 4.

As is known, field fringing lowers the load capacity of the bearing by diverting flux away from the pole gaps. Also, eddy currents generate heat on the rotor that may lead to high temperatures that cause failure of rotor components. Accordingly, one aspect of the present invention includes shaping poles to mitigate both fringing and eddy currents. For example, during the shaping and laminate etching process, the pole tip or edge spacing can be carefully reduced to balance eddy current and fringing reduction with local saturation. The selection of the pole shape is performed at the design stage by utilizing magnetic field simulation software. Etching is a chemical process that removes smeared material that connects (shorts) individual laminates.

In another aspect of the present invention, the number of poles is determined using methodologies that increase reliability. The reliability of magnetic bearings in the presence of pole failures depends on the number of poles utilized. In an exemplary process, the number of poles is based on a statistical search approach. Under this process, This approach considers increasing the number of poles to improve the success rate for shaft levitation considering a myriad of coil failure combinations. The success rate is evaluated via simulations.

In another aspect of the present invention, the force-to-weight ratio of the poles is optimized to provide powerful yet lightweight poles. In one exemplary application, magnetic field simulations are employed to identify regions in the pole that can be removed or reduced without significantly impairing the magnetic field generated by the pole. For example, such regions can occur in the attachment of the magnetic bearings to the machine housing. Advantageously, removal of these magnetically under-utilized regions in the flux circuit that can be removed reduces the weight of the poles but has little, if any, deleterious effect on the magnetic field.

In some embodiments, the weight reduced magnetic bearing utilizes materials that are fragile. To accommodate such fragile material, a suitable assembly procedure includes inserting ceramic magnets into the back iron and stator laminates while reducing the magnetic properties of ceramic magnets using applied forces. Support elements adapted to receive and hold the magnets and bearing parts in precise position while a potting material applied to these parts is vacuum cured.

| NOMENCLATURE | |
|---|---|
| $a_d =$ | dead pole face area of radial bearing |
| $a' =$ | axial pole face area of combo bearing |
| $C_e, C_c =$ | housing damping, contact damping |
| $e =$ | rotor eccentricity |
| $g_0, g_{0d} =$ | radial air gap, air gap of dead pole of radial bearing |
| $H_c =$ | coercive force of permanent magnet |
| $I_{tr}, I_{pr} =$ | rotor transverse and polar moment of inertia |
| $I_{t1h}, I_{t2h} =$ | housing transverse moment of inertia |
| $K_e, K_c =$ | housing stiffness, contact stiffness |
| $L_{pm} =$ | length of permanent magnet |
| $M_h, M_r =$ | mass of housing, mass of rotor |
| $N_{c1}, N_{c2}, N_{c3} =$ | number of turns on decoupling chokes |
| $R_{c1}, R_{c2} =$ | air gap reluctance of decoupling chokes |
| $\theta_i =$ | the angle of the ith radial pole |
| $\mu =$ | dynamic friction coefficient |
| $\Phi =$ | flux vector |
| $\omega =$ | rotor angular velocity |
| $R_p =$ | pole reliability |
| $\tau_d =$ | delay time to swap in appropriate CDM after pole failure event |

Those of skill in the art will recognize that numerous modifications and changes may be made to the exemplary designs and embodiments described herein and that the invention is limited only by the claims that follow and any equivalents thereof.

The invention claimed is:

1. A magnetic bearing for supporting a spinning shaft, the magnetic bearing having a rotor formed on a portion of the shaft and a stator positioned around the rotor, the magnetic bearing comprising:
   (a) a plurality of poles in the stator adapted to create a magnetic field that supports the rotor, each pole producing a pole force and being separated by pole gaps;
   (b) a set of permanent magnetic elements associated with the plurality of poles that create a homopolar, bias magnetic field in the pole gaps; and
   (c) a controller operatively coupled to the poles, the controller programmed with instructions to change the current to each pole in response to at least a partial loss of current to one or mow of the poles.

2. The magnetic bearing according to claim 1 wherein the controller includes a current distribution matrix for determining a current value for each pole in response to a failure in at least one of the poles.

3. The magnetic bearing according to claim 1 wherein the controller is programmed to provide a linearized and decoupled relationship between a control voltage applied to the poles and the control force created by the poles.

4. The magnetic bearing according to claim 1 further comprising at least one decoupling choke supplying power to the poles.

5. The magnetic bearing according to claim 4 further comprising at least one secondary decoupling choke conditioning the magnetic field created by the poles.

6. The magnetic bearing according to claim 1 wherein the poles are shaped to reduce eddy currents and field fringing.

7. The magnetic bearing according to claim 1 wherein the number of poles is selected by performing a statistical analysis of multiple pole configurations.

8. The magnetic bearing according to claim 1 wherein the poles are shaped at least partially based on magnetic field simulations that identify mass in magnetically underutilized regions.

9. The magnetic bearing of claim 1 adapted to support the spinning shaft in one of (i) a radial direction, and (ii) an axial direction.

10. A method for supportting a spinning shaft having a rotor formed thereon and a stator positioned around the rotor, the method comprising:
   (a) creating a magnetic field that supports the rotor using a plurality of poles in the stator, each pole producing a pole force and being separated by pole gaps;
   (b) providing a set of permanent magnetic elements associated with the plurality of poles that create a homopolar; bias magnetic field in the pole gaps; and
   (c) controlling the poles with a controller, the controller programmed with instructions to change the current to each pole in response to at least a partial loss of current to one or more of the poles.

11. The magnetic bearing according to claim 10 wherein the controller includes a current distribution matrix for determining a current value for each pole in response to a failure in at least one of the poles.

12. The method according to claim 10 further comprising programming the controller to provide a linearized and decoupled relationship between a control voltage applied to the poles and the control force created by the poles.

13. The method according to claim 10 further comprising supplying power to the poles using at least one decoupling choke.

14. The method according to claim 13 further comprising conditioning the magnetic field created by the poles using at least one secondary decoupling choke.

15. The method according to claim 10 further comprising shaping the poles to reduce eddy currents and field fringing.

16. The method according to claim 10 wherein the number of poles is selected by performing a statistical analysis of multiple pole configurations.

17. The method according to claim 10 further comprising shaping the poles by removing mass in magnetically underutilized regions, the underutilized regions being identified using magnetic field simulations.

18. The method of claim 10 further comprising supporting the spinning shaft in one of (i) a radial direction, and (ii) an axial direction.

19. The method of claim 10 further comprising assembling the permanent magnetic elements into the stator by applying a force that reduces the magnetic properties of the permanent magnetic element and holding the permanent magnetic element in the stator using a support element.

* * * * *